(12) United States Patent
Tagata

(10) Patent No.: US 10,409,354 B2
(45) Date of Patent: Sep. 10, 2019

(54) MULTI-CORE PROCESSOR, POWER CONTROL METHOD, AND PROGRAM

(71) Applicant: NEC Corporation, Tokyo (JP)

(72) Inventor: Kenji Tagata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 75 days.

(21) Appl. No.: 15/084,729

(22) Filed: Mar. 30, 2016

(65) Prior Publication Data

US 2016/0291667 A1    Oct. 6, 2016

(30) Foreign Application Priority Data

Mar. 30, 2015  (JP) ................................. 2015-068828

(51) Int. Cl.
| G06F 1/3206 | (2019.01) |
| G06F 1/3234 | (2019.01) |
| G06F 1/329 | (2019.01) |
| G06F 9/50 | (2006.01) |

(52) U.S. Cl.
CPC ............ *G06F 1/3206* (2013.01); *G06F 1/329* (2013.01); *G06F 1/3243* (2013.01); *G06F 9/5094* (2013.01); *Y02D 10/152* (2018.01); *Y02D 10/24* (2018.01)

(58) Field of Classification Search
CPC ......... G06F 9/5094; G06F 1/26; G06F 1/3206
See application file for complete search history.

(56) References Cited

U.S. PATENT DOCUMENTS

| 6,834,353 B2 | 12/2004 | Smith et al. |
| 8,006,108 B2 | 8/2011 | Brey et al. |
| 2009/0070607 A1* | 3/2009 | Safford ................. G06F 1/3203 713/320 |
| 2014/0089690 A1* | 3/2014 | Fukuda ..................... G06F 1/26 713/300 |
| 2014/0181545 A1* | 6/2014 | Shrall .................... G06F 1/3206 713/320 |
| 2015/0067356 A1* | 3/2015 | Trichy Ravi ............ G06F 1/324 713/300 |
| 2015/0177799 A1* | 6/2015 | Gendler ................ G06F 1/3206 713/300 |

FOREIGN PATENT DOCUMENTS

| JP | 2005527010 | 9/2005 |
| JP | 2009116862 | 5/2009 |
| JP | 2013-518346 | 5/2013 |
| JP | 5585651 | 9/2014 |

OTHER PUBLICATIONS

Japanese Office Action dated May 17, 2016, with English Translation; Application No. 2015-068828.

* cited by examiner

*Primary Examiner* — Jaweed A Abbaszadeh
*Assistant Examiner* — Alyaa T Mazyad
(74) *Attorney, Agent, or Firm* — Young & Thompson

(57) ABSTRACT

A multi-core processor has: a plurality of processor cores; and a power management part managing power supplied to the plurality of processor cores. The power management part has a supplied electric energy determination part determining maximum supplied electric energy for each of the plurality of processor cores. The maximum supplied electric energy is an upper limit value of supplied electric energy which can be supplied to the processor core.

9 Claims, 13 Drawing Sheets

BASIS OF RATIO OF ELECTRIC ENERGY CONSUMED BY RESPECTIVE PROCESSOR CORES

MAXIMUM ELECTRIC ENERGY FOR EACH CORE PRIORITY

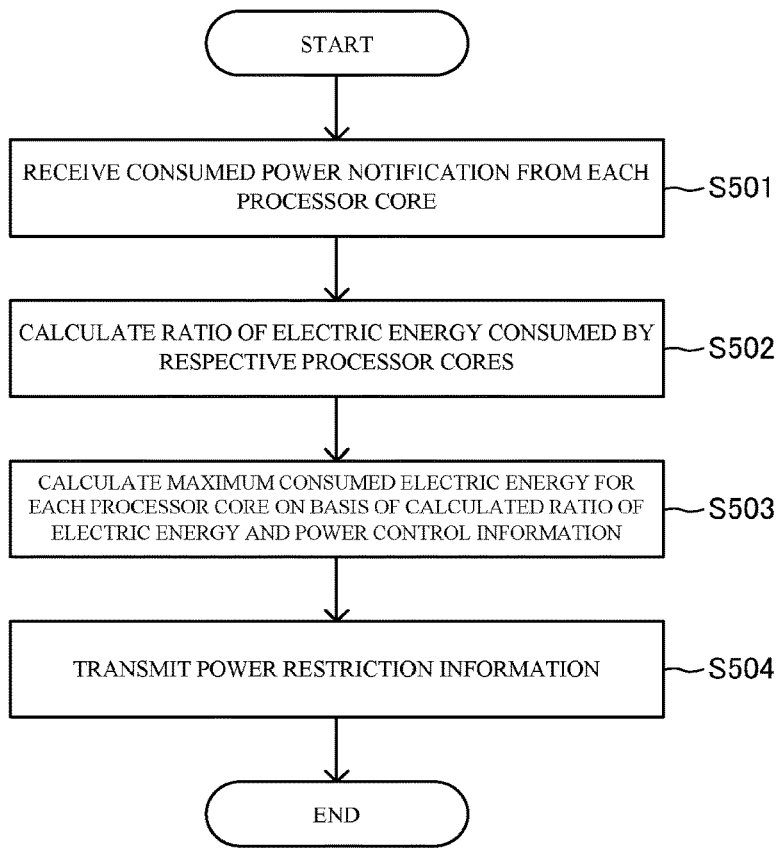
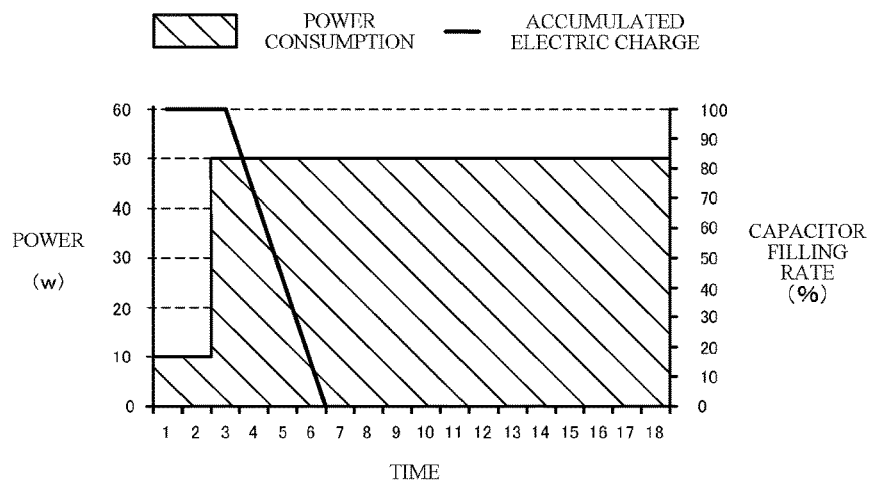

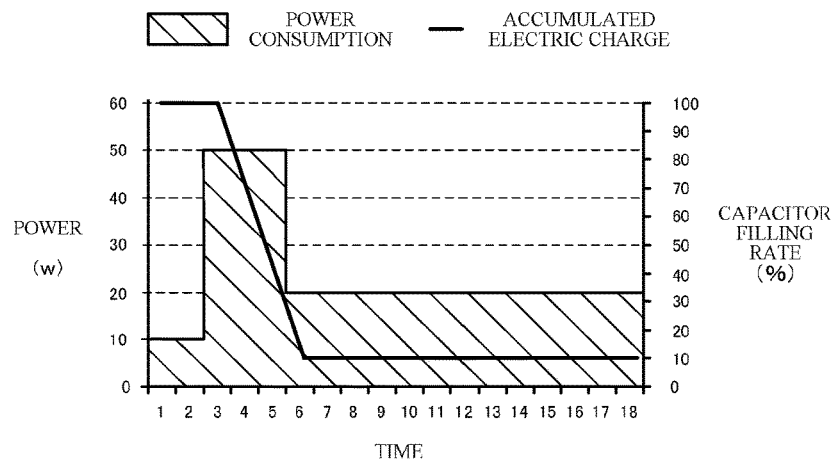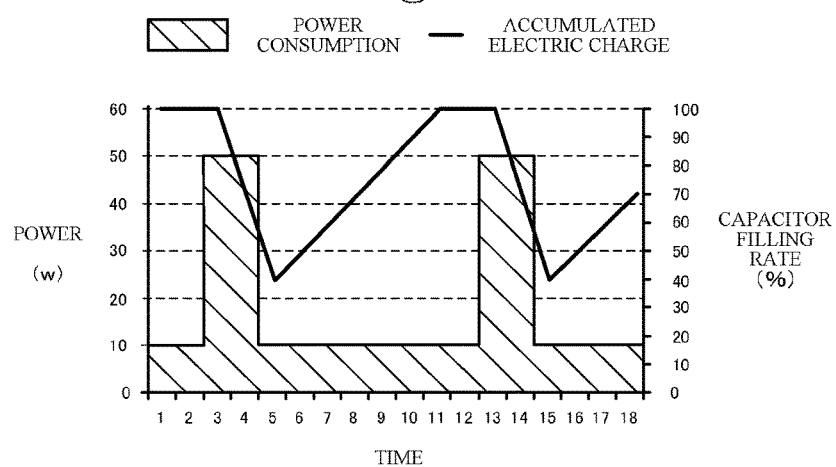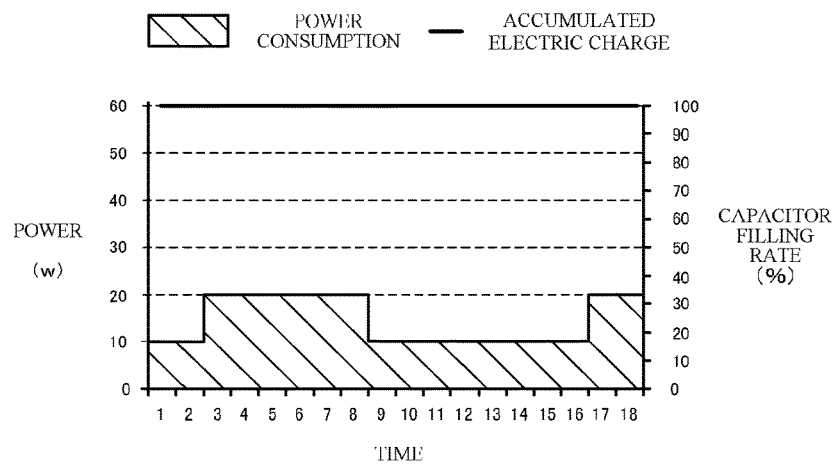

MULTI-CORE PROCESSOR, POWER CONTROL METHOD, AND PROGRAM

INCORPORATION BY REFERENCE

This application is based upon and claims the benefit of priority from Japanese patent application No. 2015-068828, filed on Mar. 30, 2015, the disclosure of which is incorporated herein in its entirety by reference.

TECHNICAL FIELD

The present invention relates to a multi-core processor, a power control method, and a program.

BACKGROUND ART

It is known as the so-called dark silicon problem that all the transistors cannot be caused to operate simultaneously because of the balance with power consumption.

Due to the abovementioned problem, there is a case where an electronic circuit needs limitation of the operation thereof as necessary. That is to say, because there is a fear that simultaneous operation of all the circuits results in excessive power consumption and malfunction, there is a case where it is required to limit the operation of the circuits as necessary and thereby prevent excessive power consumption.

As one of the techniques for preventing such an operation of the circuits, Patent Document 1 is known, for example. Patent Document 1 discloses a processor which includes a power accumulation part accumulating power information about power consumed during issuance of an instruction, a comparison part comparing the accumulated power information with a given threshold, and a control part blocking another instruction from being issued. According to Patent Document 1, in a case where the accumulated power information exceeds the threshold, the control part blocks another instruction from being issued.

Further, a technique for limiting power consumption in a multi-core system is shown in Patent Document 2, for example. Patent Document 2 discloses a multi-core system having a processing time estimation part and a task allocation pattern setting part. According to Patent Document 2, the task allocation pattern setting part sets a task allocation pattern so that the size of the cache used by tasks is the minimum and power consumption is the minimum within a range that a task processing time estimated by the processing time estimation part satisfies a real-time constraint according to deadline information. According to Patent Document 2, the abovementioned configuration enables allocation of the cache to more tasks, and consequently, the frequency of occurrence of cache rewrite can be reduced even when task switching occurs.

Patent Document 1: Japanese Unexamined Patent Application Publication No. JP-A 2013-518346
Patent Document 2: Japanese Patent No. 5585651

However, use of the techniques as disclosed in Patent Documents 1 and 2 may cause a case where electric power usable for an LSI cannot be used up. As a result, there is a case where limitation such as decrease of the issuance rate is put and the performance is diminished though the LSI can still consume electric power.

As stated above, a multi-core processor has a problem that it is difficult to control power consumption for each processor core without diminishing the performance of the whole.

SUMMARY OF THE INVENTION

Accordingly, an object of the present invention is to provide an electronic circuit which solves the problem that it is difficult to control power consumption for each processor core in a multi-core processor without diminishing the performance of the whole.

In order to achieve the object, a multi-core processor as another aspect of the present invention has: a plurality of processor cores; and a power management part managing power supplied to the plurality of processor cores. The power management part has a supplied electric energy determination part determining maximum supplied electric energy for each of the plurality of processor cores. The maximum supplied electric energy is an upper limit value of supplied electric energy which can be supplied to the processor core.

Further, a power control method as another aspect of the present invention includes determining maximum supplied electric energy for each of a plurality of processor cores. The maximum supplied electric energy is an upper limit value of supplied electric energy which can be supplied to the processor core. Power is supplied to each of the plurality of processor cores on a basis of the determined maximum supplied electric energy.

A non-transitory computer-readable medium storing a program as another aspect of the present invention is a non-transitory computer-readable medium storing a program including instructions for causing an information processing device to realize a power management unit managing power supplied to a plurality of processor cores. The power management unit determines maximum supplied electric energy for each of the plurality of processor cores. The maximum supplied electric energy is an upper limit value of supplied electric energy which can be supplied to the processor core.

With the configurations as described above, the present invention can provide a multi-processor which solves the problem that it is difficult to control power consumption for each processor core in a multi-core processor without diminishing the performance of the whole.

BRIEF DESCRIPTION OF DRAWINGS

FIG. 11 is a flowchart for describing the operation of an LSI power management part according to the first exemplary embodiment of the present invention;

FIG. 12 is a graph showing an example of the relation between accumulated electric charge in a capacitor and power consumption in a circuit having the capacitor;

FIG. 13 is a graph showing an example of the relation between accumulated electric charge in a capacitor and power consumption in a circuit having the capacitor;

FIG. 14 is a graph showing an example of the relation between accumulated electric charge in a capacitor and power consumption in a circuit having the capacitor;

FIG. 15 is a graph showing an example of control without consideration of a capacitor;

EXEMPLARY EMBODIMENT

Figure 1:
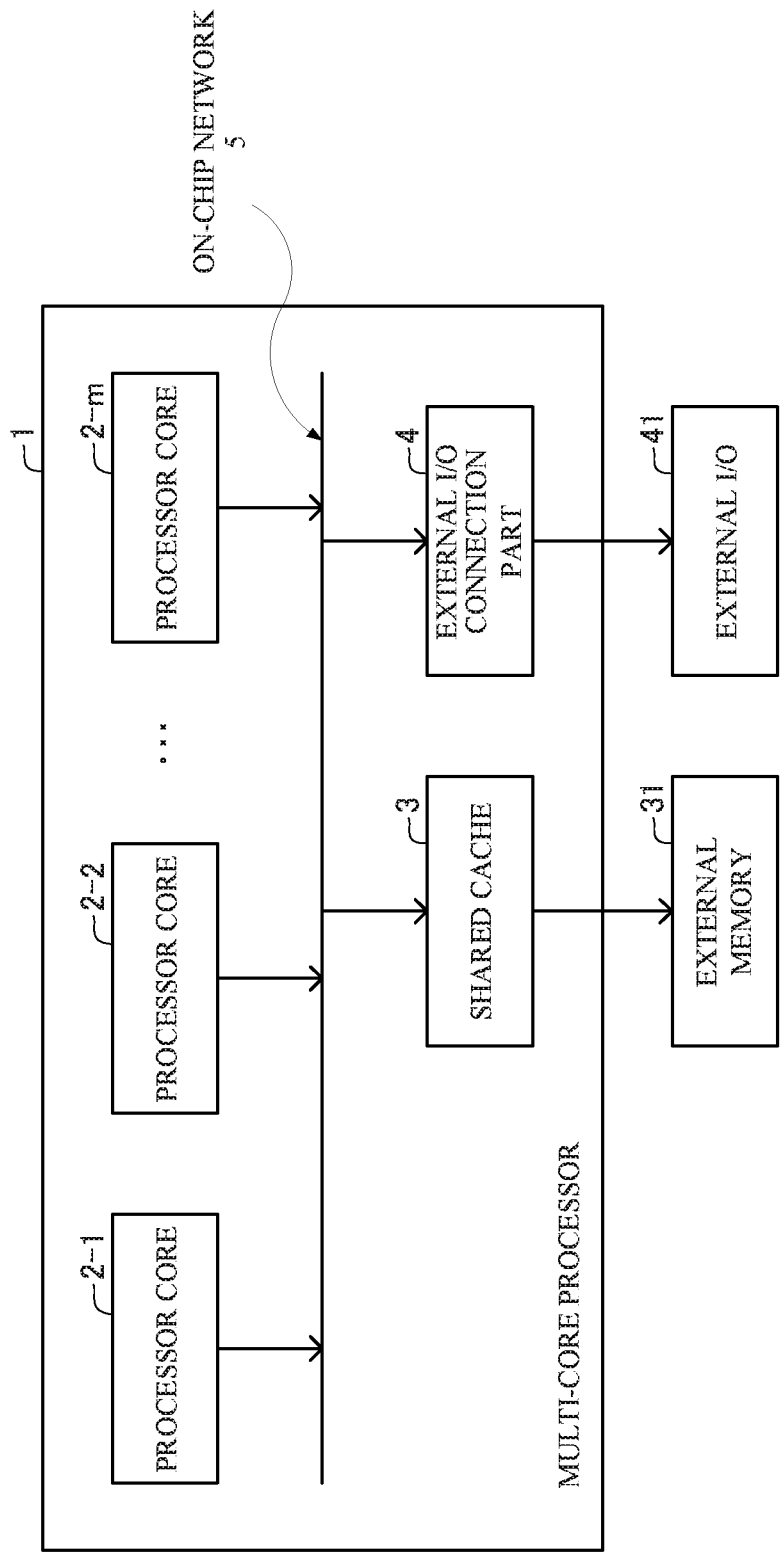
FIG. 1 a block diagram schematically showing the configuration of a whole multi-core processor according to a first exemplary embodiment of the present invention.
Figure 2:
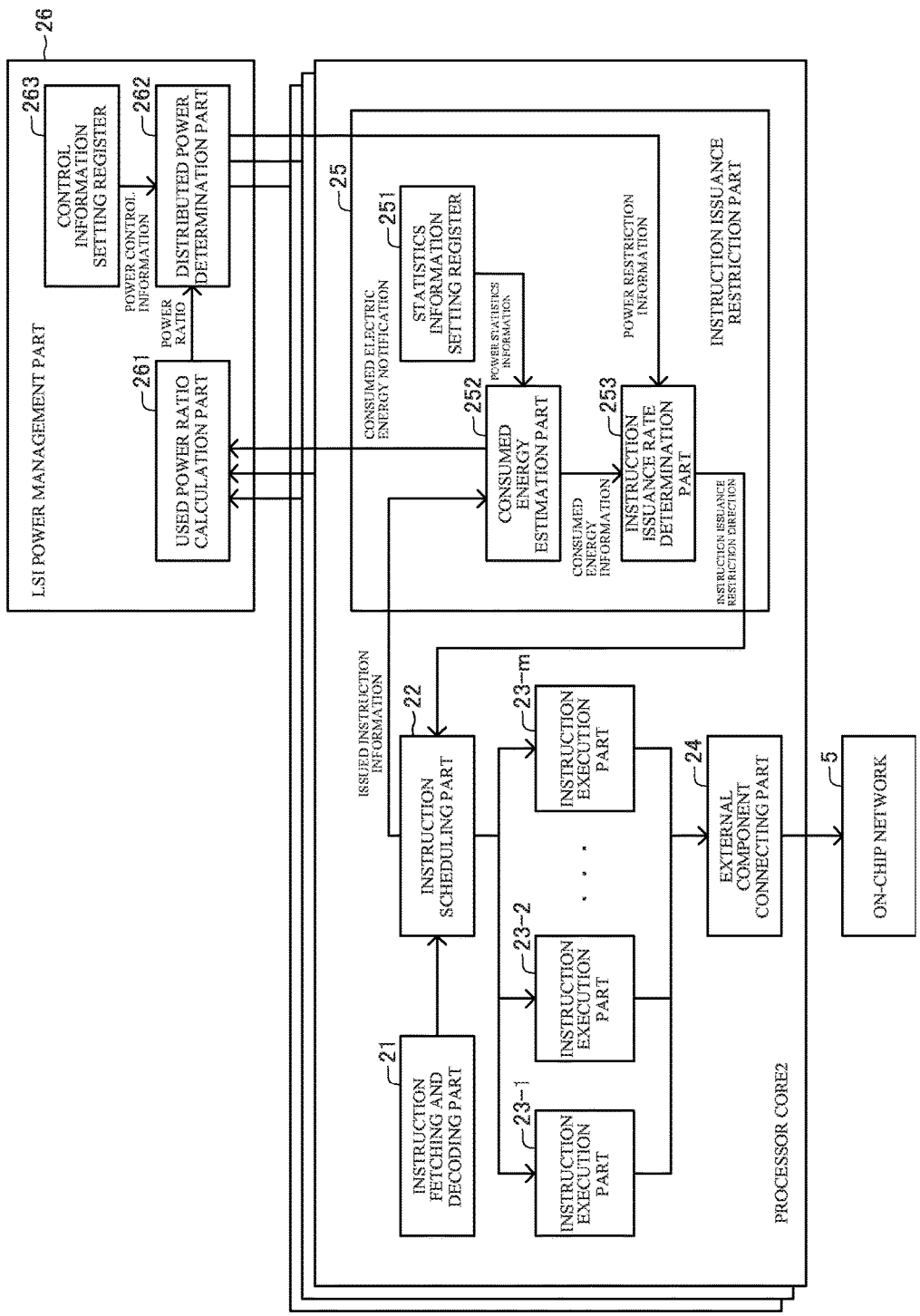
FIG. 2 is a block diagram showing an example of the configuration of a processor core according to the first exemplary embodiment of the present invention.
Figure 3:
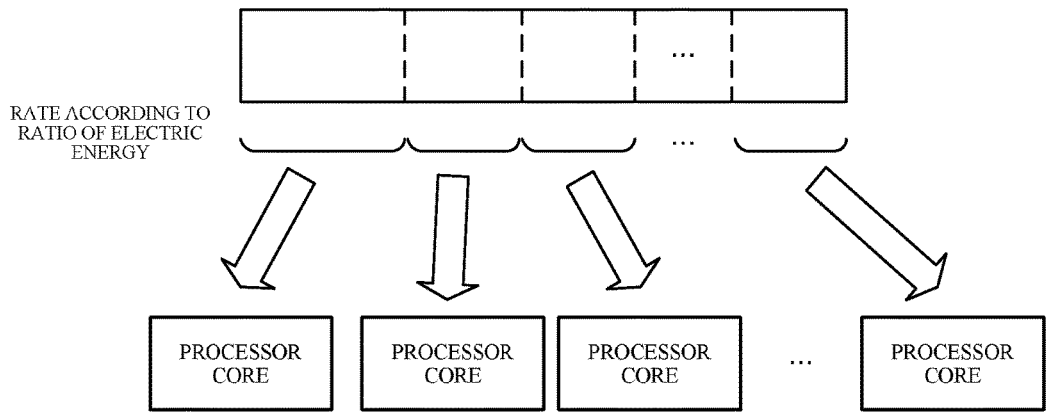
FIG. 3 is a diagram for describing an example of an algorithm used when a distributed power determination part determines maximum supplied electric energy for each processor core according to the first exemplary embodiment of the present invention.
Figure 4:
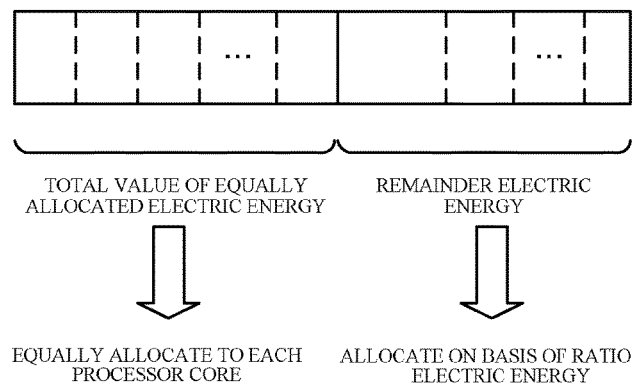
FIG. 4 is a diagram for describing another example of an algorithm used when the distributed power determination part determines maximum supplied electric energy for each processor core according to the first exemplary embodiment of the present invention.
Figure 5:
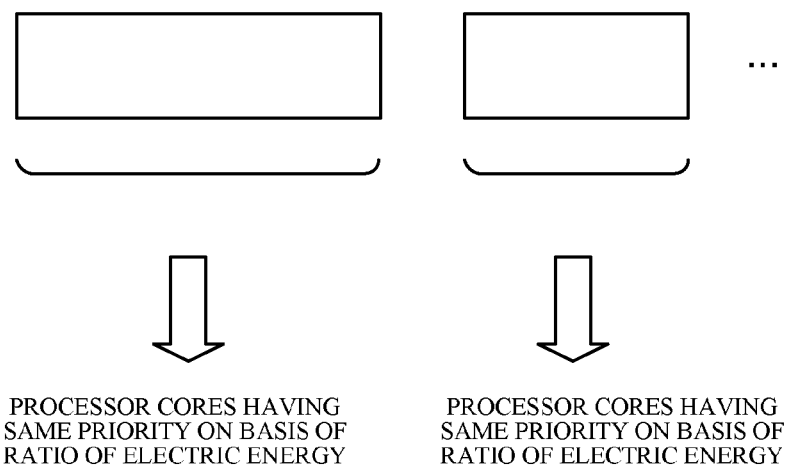
FIG. 5 is a diagram for describing another example of an algorithm used when the distributed power determination part determines maximum supplied electric energy for each processor core according to the first exemplary embodiment of the present invention.
Figure 6:
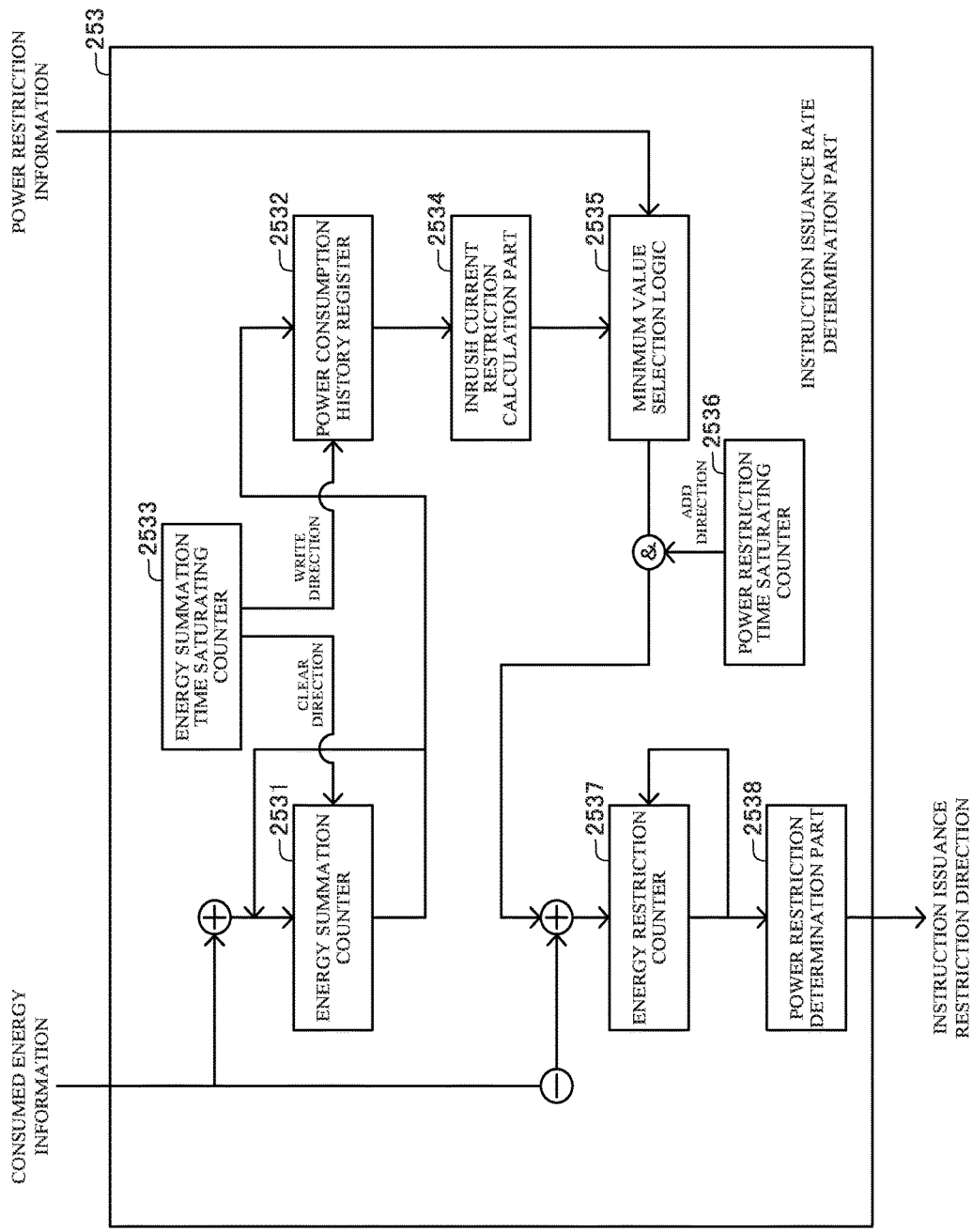
FIG. 6 is a block diagram showing an example of the configuration of an instruction issuance rate determination part according to the first exemplary embodiment of the present invention.
Figure 7:
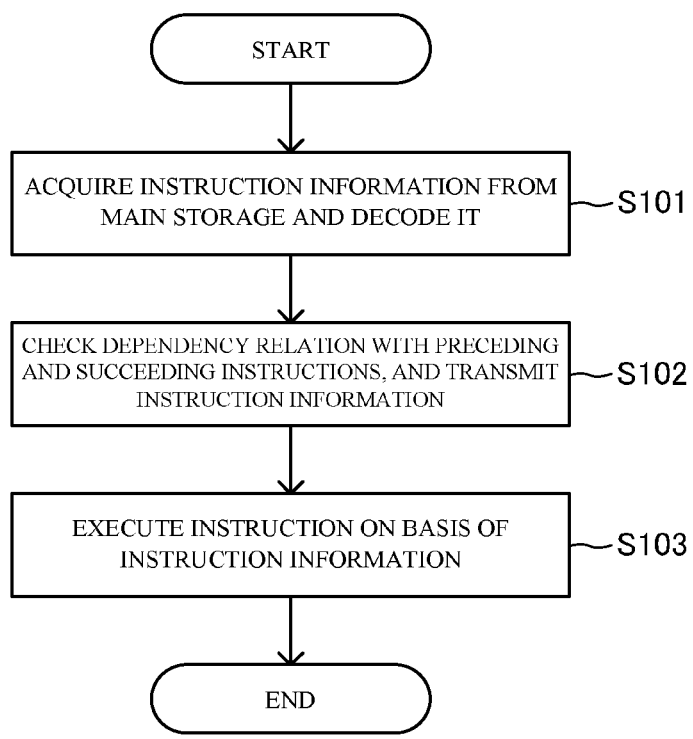
FIG. 7 is a flowchart showing an example of the operation of the processor core according to the first exemplary embodiment of the present invention.
Figure 8:
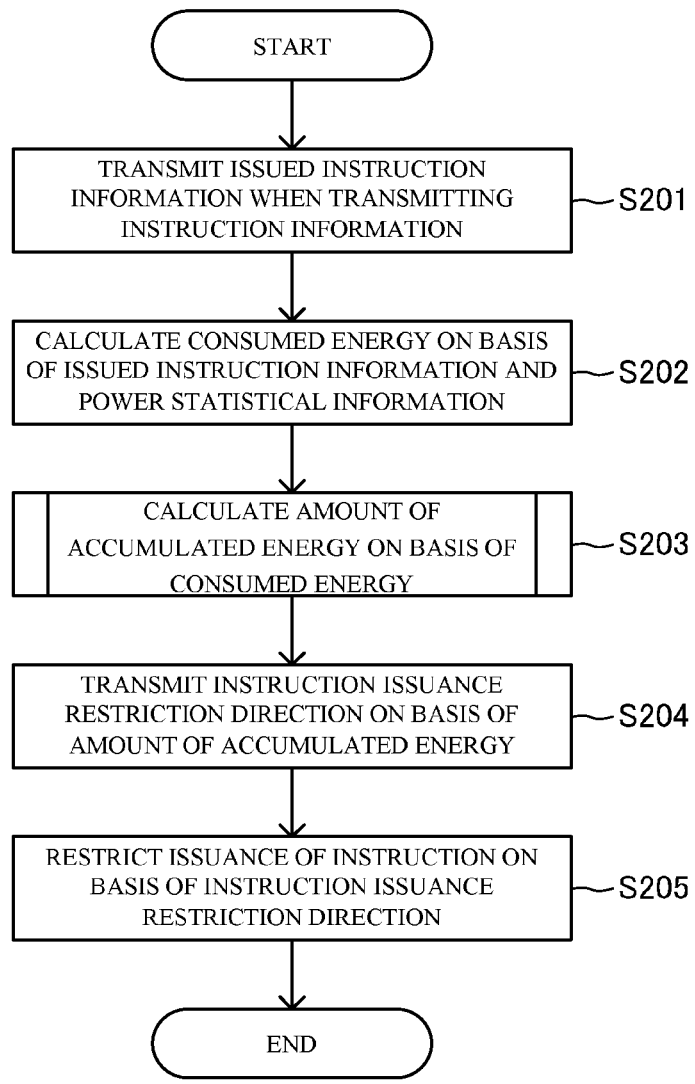
FIG. 8 is a flowchart showing an example of the operation of the processor core according to the first exemplary embodiment of the present invention.
Figure 9:
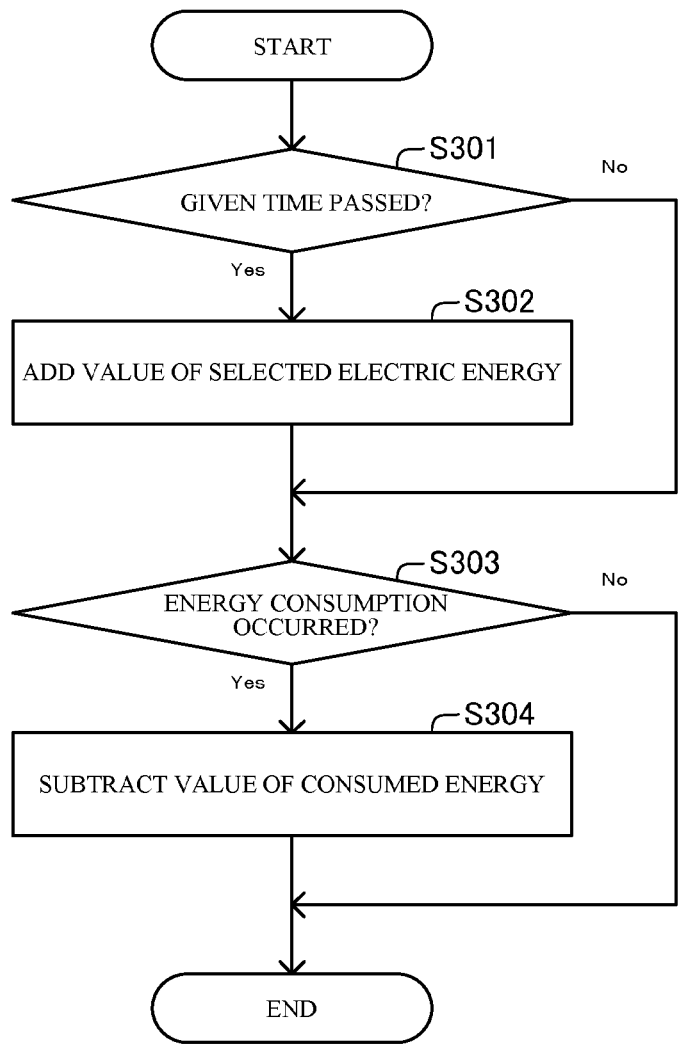
FIG. 9 is a flowchart showing an example of the operation of the instruction issuance rate determination part included by the processor core in calculating accumulated energy according to the first exemplary embodiment of the present invention.
Figure 10:
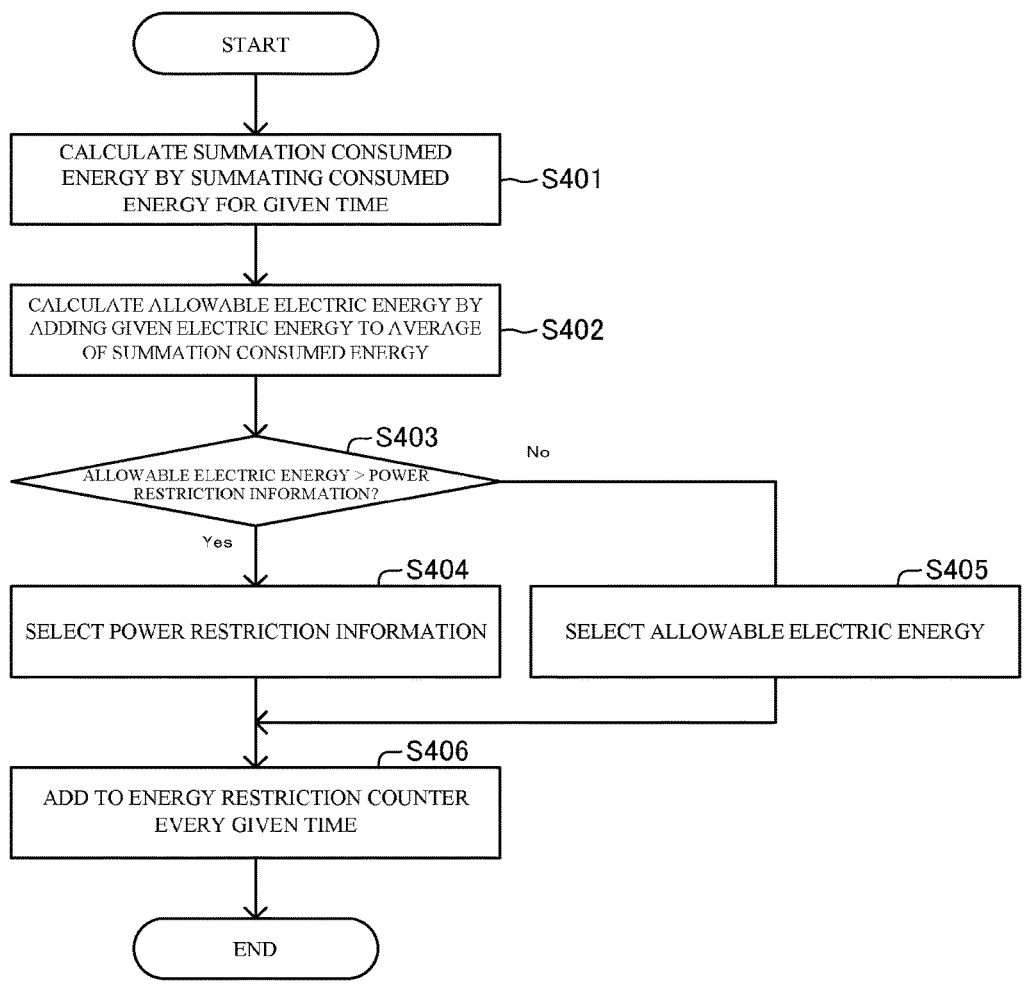
FIG. 10 is a flowchart showing an example of the operation performed from reception of consumed energy information by the instruction issuance rate determination part included by the processor core to selection of electric energy by a minimum value selection logic according to the first exemplary embodiment of the present invention.

A first exemplary embodiment of the present invention will be described referring to FIGS. 1 to 11. FIG. 1 is a block diagram schematically showing the configuration of a whole multi-core processor 1. FIG. 2 is a block diagram showing an example of the configuration of a processor core 2. FIGS. 3 to 5 are diagrams for describing examples of an algorithm used when a distributed power determination part 262 determines maximum supplied electric energy for each processor core 2. FIG. 6 is a block diagram showing an example of the configuration of an instruction issuance rate determination part 253. FIGS. 7 and 8 are flowcharts showing examples of the operation of the processor core 2. FIG. 9 is a flowchart showing an example the operation of the instruction issuance rate determination part 253 in calculating the amount of accumulated energy. FIG. 10 is a flowchart showing an example of the operation performed from reception of consumed energy information by the instruction issuance rate determination part 253 to selection of electric energy by a minimum value selection logic 2535. FIG. 11 is a flowchart for describing the operation of an LSI power management part 26. FIGS. 12 to 15 are graphs showing examples of the relation between accumulated electric charge in a capacitor and consumed energy.

In the first exemplary embodiment of the present invention, the multi-core processor 1 capable of setting the upper limit of power for each processor core 2 will be described. As described later, each processor core 2 in this exemplary embodiment calculates energy which is consumed in executing arithmetic processing appropriate for an issued instruction on the basis of the instruction (consumed energy). Moreover, each processor core 2 calculates the amount of accumulated energy which is energy accumulated in capacitors inside and outside a chip on the basis of the calculated consumed energy and energy supplied to the processor core 2 (supplied energy). Each processor core 2 then limits issuance of a new instruction by the processor core 2 with consideration of the energy accumulated in the capacitor. Consequently, each processor core 2 sets the upper limit of power for the processor core 2.

Further, in the multi-core processor 1 in this exemplary embodiment, the upper limit value of supplied electric energy which can be supplied to each processor core 2 is determined on the basis of consumed energy calculated by each processor core 2. As described later, supplied energy which is supplied to the processor core 2 is calculated in accordance with the determined upper limit value of supplied electric energy which can be supplied to each processor core 2.

In the following description, for ease of explanation, malfunction will be supposed to be caused when accumulated electric charge in the capacitor become 0. However, as a physical phenomenon, it is thought that malfunction may be caused when voltage supplied to a circuit decreases by 10% or so. Consequently, it can be assumed that about 10% of accumulated electric charge in the capacitor around the electronic circuit (processor core 2) changes in a range where malfunction is not caused.

Therefore, in the following description, accumulated energy in the capacitor proportional to the square of electric charge and so on will be used for calculation assuming it is linear. This is because the square of a value x which is small to some extent is sufficiently small and thus the square of (1+x) can be handled as 1+2x. For the same reason, accumulated electric charge in the capacitor will be used for calculation as energy in the following description.

The multi-core processor 1 has a resistor, a capacitor and so on which are not shown in the drawings, and is configured to be able to execute arithmetic processing. Referring to FIG. 1, the multi-core processor 1 has a plurality of processor cores 2-1, 2-2, . . . , 2-m (hereinafter, referred to as processor cores 2 when not distinguished particularly), a shared cache 3, and an external I/O (Input/Output) connection part 4.

The processor core 2 is a circuit which executes arithmetic processing. The processor core 2 is connected to the shared cache 3 and the external I/O connection part 4 via the on-chip network 5.

The shared cache 3 is a storage device shared by the processor cores 2. The shared cache 3 is connected to an external memory 31, which is a memory outside the multi-core processor 1. The external memory 31 is, for example, a semiconductor memory such as a DRAM (Dynamic Random Access Memory). Meanwhile, the external memory 31 may be a storage element such as a SRAM (Static Random Access Memory) and a NAND flash memory.

The external I/O connection part 4 is connected to an external I/O 41. The external I/O 41 is, for example, PCI Express. The external I/O 41 may be other than PCI Express.

FIG. 2 is a diagram showing an example of the configuration of the processor core 2. Referring to FIG. 2, the processor core 2 has, for example, an instruction fetching and decoding part 21, an instruction scheduling part 22, a plurality of instruction execution parts 23-1, 23-2, . . . , 23-m (hereinafter, referred to as instruction execution parts 23 when not distinguished particularly), an external component connection part 24, and an instruction issuance restriction part 25. Each processor core 2 is connected to the LSI power management part 26.

The respective functions (the respective parts) described above are realized on the processor core 2, for example, by execution of a program stored in a storage device (not shown in the drawings) by the processor core 2. Further, the LSI power management part 26 is realized, for example, by execution of a program stored in a storage device (not shown in the drawings) by any one of the plurality of processor cores 2.

The instruction fetching and decoding part 21 reads out instruction information from a main storage device (not illustrated), and analyzes the read-out instruction information. Then, the instruction fetching and decoding part 21 transmits the analyzed instruction information to the instruction scheduling part 22. Thus, a function which the instruction fetching and decoding part 21 has is a general one. Therefore, the detailed description of the instruction fetching and decoding part 21 will be omitted.

The instruction scheduling part 22 monitors the instruction execution part 23, and transmits instruction information to the instruction execution part 23. For example, the instruction scheduling part 22 monitors the instruction execution part 23 on the basis of the received instruction information, and monitors completion of execution of a preceding instruction. The instruction scheduling part 22 then transmits a prepared instruction to the instruction execution parts 23.

Further, when transmitting instruction information to the instruction execution part 23, the instruction scheduling part 22 transmits issued instruction information, which is information equivalent to the instruction information, to the instruction issuance restriction part 25. As described later, the instruction issuance restriction part 25 transmits an instruction issuance restriction direction to the instruction scheduling part 22 so that a given condition is satisfied, on the basis of the received issued instruction information. Upon receiving the instruction issuance restriction direction, the instruction scheduling part 22 decreases the rate of issuance of a new instruction or stops issuance of a new instruction depending on the content of the instruction issuance restriction direction.

The instruction execution part 23 has a cache memory and so on particular to a functional unit, a register file and a processor core. By using the components described above, the instruction execution part 23 executes an instruction on the basis of instruction information received from the instruction scheduling part 22.

In this exemplary embodiment, the processor core 2 includes a plurality of instruction execution parts 23. However, the number of the instruction execution parts 23 included by the processor core 2 may be one. Moreover, the functions of the instruction execution parts 23 included by the processor core 2 are not equivalent necessarily. The instruction execution parts 23 may be configured in a manner that, for example, one of the instruction execution parts 23 can execute an add instruction but cannot execute a memory access instruction, whereas another of the instruction execution parts 23 can execute a memory access instruction but cannot execute a branch instruction.

The external component connection part 24 is connected to the on-chip network 5. The external component connection part 24 is connected to the shared cache 3 and the external memory 31 placed outside the processor core 2, via the on-chip network 5.

The instruction issuance restriction part 25 receives issued instruction information from the instruction scheduling part 22 as stated above. On the basis of the issued instruction information, the instruction issuance restriction part 25 transmits an instruction issuance restriction direction to the instruction scheduling part 22 when a given condition is satisfied.

Referring to FIG. 2, the instruction issuance restriction part 25 includes, for example, a statistics information setting register 251, a consumed energy estimation part 252, and an instruction issuance rate determination part 253.

The statistics information setting register 251 receives power statistics information (power consumption information) for power estimation from a debug interface such as JTAG (Joint Test Action Group). Power statistics information stored by the statistics information setting register 251 is used by the consumed energy estimation part 252.

Power statistics information (power consumption information) is information showing change of power consumption of a device responding to an instruction (change of power consumption caused in processing an instruction). In the multi-core processor 1 having the shared cache 3 and so on, one operation (e.g., execution of a load instruction or an add instruction) acts on a plurality of components such as the register, the functional unit, the cache memory (the shared cache 3) and the external memory 31. Thus, let us suppose in this exemplary embodiment that power statistics information is information showing at least change of power consumption of the processor core 2 and change of power consumption of a shared portion (the shared memory 3, the external memory 31, and so on) which the processor core 2 uses when executing an instruction. Power statistics information is acquired by, for example, observing change of power consumption of the whole device including the shared portion. Power statistics information is used when the consumed energy estimation part 252 calculates consumed energy.

The statistics information setting register 251 may be mapped on a memory space and configured to be accessible via the on-chip network 5.

The consumed energy estimation part 252 calculates energy consumed by the processor core 2 in executing an instruction (consumed energy), on the basis of issued instruction information received from the instruction scheduling part 22 and power statistics information acquired from the statistics information setting register 251. Then, the consumed energy estimation part 252 transmits consumed energy information showing the calculation result (consumed energy) to the instruction issuance rate determination part 253. Moreover, the consumed energy estimation part 252 notifies consumed electric energy notification, which is information equivalent to the consumed energy information, to the LSI power management part 26.

The instruction issuance rate determination part 253 calculates the amount of accumulated energy accumulated in the capacitor, on the basis of consumed energy information received from the consumed energy estimation part 252 and power restriction information to be described later transmitted from the LSI power management part 26. The instruction issuance rate determination part 253 then outputs an instruction issuance restriction direction to the instruction scheduling part 22 when the amount of accumulated energy satisfies a given condition. As a result that the instruction issuance rate determination part 253 transmits an instruction issuance restriction direction to the instruction scheduling part 22, execution of a new instruction is restricted and power consumed by the processor core 2 is limited.

An instruction issuance restriction direction transmitted by the instruction issuance rate determination part 253 can be configured to include various instructions to the instruction scheduling part 22. For example, by transmitting an instruction issuance restriction direction to the instruction scheduling part 22, the instruction issuance rate determination part 253 can instructs decrease of the rate of issuance of a new instruction (throttling) or instructs halt of issuance of a new instruction.

The LSI power management part 26 determines maximum supplied electric energy for each of the processor cores 2 on the basis of consumed electric energy notification notified by the consumed energy estimation part 252. Maximum supplied electric energy is the upper limit value of supplied electric energy which can be supplied to the processor core 2. Then, the LSI power management part 26 transmits the determined maximum supplied electric energy as power restriction information to the instruction issuance rate determination part 253 of the processor core 2.

Referring to FIG. 2, the LSI power management part 26 has a used power ratio calculation part 261, a distributed power determination part 262, and a control information setting register 263.

The used power ratio calculation part 261 receives consumed electric energy notification notified by each of the processor cores 2. Then, the used power ratio calculation part 261 calculates the ratio of electric energy consumed by the respective processor cores 2, on the basis of the consumed electric energy notification notified by the respective processor cores 2. After that, the used power ratio calculation part 261 transmits a power ratio representing the calculated ratio of electric energy to the distributed power determination part 262.

The distributed power determination part 262 receives the power ratio from the used power ratio calculation part 261. Moreover, the distributed power determination part 262 acquires power control information to be described later from the control information setting register 263. Then, the distributed power determination part 262 determines maximum supplied electric energy for each of the processor cores 2, on the basis of the power ratio received from the used power ratio calculation part 261 and the power control information acquired from the control information setting register 263.

There are various algorithms which can be thought as an algorithm used when the distributed power determination part 262 determines maximum supplied electric energy for each of the processor cores 2.

For example, as shown in FIG. 3, the distributed power determination part 262 distributes maximum electric energy (for example, electric energy which can be supplied to the whole multi-core processor 1) set in the control information setting register 263 to the respective processor cores 2 on the basis of the power ratio notified from the used power ratio calculation part 261. In other words, the distributed power determination part 262 distributes predetermined maximum electric energy to the respective processor cores 2 on the basis of the ratio of electric energy consumed by the respective processor cores 2. Thus, the distributed power determination part 262 determines maximum supplied electric energy for each of the processor cores 2. This can be thought as an example of the algorithm used when the distributed power determination part 262 determines maximum supplied electric energy for each of the processor cores 2.

Further, for example, as shown in FIG. 4, the distributed power determination part 262 distributes fixed power to the respective processor cores 2 in accordance with equally allocated electric energy (for example, minimum electric energy with which the respective processor cores 2 can operate) set in the control information setting register 263, regardless of the power ratio notified from the used power ratio calculation part 261. Then, on the basis of the power ratio notified from the used power ratio calculation part 261, the distributed power determination part 262 distributes remainder electric energy left after subtracting the total value of the equally allocated electric energy from the maximum electric energy set in the control information setting register 263, to the respective processor cores 2. In short, the distributed power determination part 262 distributes the remainder left after subtracting the total value of electric energy equally allocated to the respective processor cores from the maximum electric energy, to the respective processor cores 2 on the basis of the power ratio, and thereby determines maximum supplied electric energy for each of the plurality of processor cores 2. The distributed power determination part 262 may determine maximum supplied electric energy for each of the processor cores 2 by using such an algorithm, for example.

Further, for example, as shown in FIG. 5, the distributed power determination part 262 determines maximum supplied electric energy for each of the processor cores 2 on the basis of a core priority set in the control information setting register 263. Let us suppose a case where core priorities and maximum electric energy for each of the core priorities are stored in the control information setting register 263, for example, as shown in FIG. 5. In this case, the distributed power determination part 262 distributes maximum electric energy set for each of the core priorities to the processor cores 2 having the same core priority, and thereby determines maximum supplied electric energy for each of the processor cores 2. Moreover, for example, in distributing the maximum electric energy on the basis of the ratio of electric energy consumed by the respective processor cores 2, the distributed power determination part 262 may control so that more electric energy is distributed to the processor cores 2 having a higher core priority. Thus, the distributed power determination part 262 may determine maximum supplied electric energy for each of the processor cores 2 by using the algorithm considering core priorities.

As stated above, the distributed power determination part 262 determines maximum supplied electric energy for each of the processor cores 2 by using various algorithms on the basis of a power ratio and power control information. After that, the distributed power determination part 262 transmits the determined maximum supplied electric energy as power restriction information to each of the processor cores 2. Meanwhile, the distributed power determination part 262 may determine maximum supplied electric energy for each of the processor cores 2 by using an algorithm other than those illustrated above.

In the control information setting register 263, various power control information used when the distributed power determination part 262 determines maximum supplied electric energy for each of the processor cores 2 is stored. For example, the control information setting register 263 stores the abovementioned maximum electric energy, equally allocated electric energy, core priorities and so on as power control information. Moreover, as power control information, the control information setting register 263 can store, for example, information on an algorithm used when the distributed power determination part 262 determines maximum supplied electric energy.

Subsequently, the details of the instruction issuance restriction part 25 will be described below. First, the consumed energy estimation part 252 will be described in detail.

The consumed energy estimation part 252 calculates consumed energy, which is energy consumed under an instruction shown by issued instruction information, on the basis of the issued instruction information and power statistics information as stated above. The consumed energy estimation part 252 estimates consumed energy by using various sorts of information included in the issued instruction information.

The consumed energy estimation part 252 calculates energy to be consumed by using, for example, the kind of an operation showing addition, memory access or the like (I), the number of register files to be read out (Rn), the number of times of operations (N), and so on.

Meanwhile, the consumed energy estimation part 252 may be configured to calculate consumed energy by using information other than the above (e.g., the number of registers to be written). The number of times of operations (N) corresponds to an operator width in a SIMD (Single Instruction Multiple Data) instruction and a vector length in a vector instruction in a vector processor.

The abovementioned information is necessary because energy to be consumed changes depending on the information. For example, a SIMD instruction for executing a plurality of operations with one instruction is thought to consume more energy than a general instruction for executing one operation with one instruction. Moreover, even under the same operation instruction, there is a difference in number of times of referring to a register file between a case of reading out two operands from a register file and a case of reading out one operand from a register file and using an immediate value designated in the instruction as the other. Therefore, it is thought that there is a difference in energy consumed in execution of the instruction. Thus, the consumed energy estimation part 252 calculates consumed energy by using the information as mentioned above, for example.

Further, the consumed energy estimation part 252 previously calculates energy consumed for each kind of instruction (Ei) and energy consumed in reading out from a register (Eir) by using power statistics information.

Then, the consumed energy estimation part 252 calculates consumed energy by using the kind of an operation (I), the number of register files to be read (Rn), the number of times of operations (N), energy consumed for each kind of instruction (Ei) and energy consumed in reading out from a register (Eir) as described above. To be specific, the consumed energy estimation part 252 calculates consumed energy on the basis of the following equation, for example:

$$\text{energy consumed under instruction (consumed energy)} = Ei \times N + Eir \times Rn \times N$$

In this exemplary embodiment, consumed energy calculated by the consumed energy estimation part 252 is represented by an integer number. For example, the consumed energy estimation part 252 expresses by associating a numerical value "1" with 1 pJ. The integer number 1 expressed by the consumed energy estimation part 252 represents a specific amount of energy. Meanwhile, the consumed energy estimation part 252 may associate in a way other than illustrated above. For example, the consumed energy estimation part 252 may associate the numerical value "1" with 3 pJ.

Further, energy (Ei) consumed for each kind of instruction calculated by the consumed energy estimation part 252 includes energy consumed by the shared portion operating under the instruction. In other words, in response to an instruction such as a load/store instruction for which access to the on-chip network 5 and the shared cache 3 is expected, the consumed energy estimation part 252 calculates a probabilistic weighted energy value which considers the rate of access to the cache memory.

The consumed energy estimation part 252 calculates consumed energy in the abovementioned manner, for example. Then, the consumed energy estimation part 252 transmits consumed energy information showing the calculated consumed energy to the instruction issuance rate determination part 253. Moreover, the consumed energy estimation part 252 notifies consumed electric energy notification information, which is equivalent to the consumed energy information, to the LSI power management part 26.

Subsequently, the instruction issuance rate determination part 253 will be described in detail.

FIG. 6 shows an example of the configuration of the instruction issuance rate determination part 253. Referring to FIG. 6, the instruction issuance rate determination part 253 has an energy summation counter 2531, a power consumption history register 2532 (a consumed energy information storage part), an energy summation time saturating counter 2533, an inrush current restriction calculation part 2534 (an allowable electric energy calculation part), a minimum value selection logic 2535 (a supplied energy selection part), a power restriction time saturating counter 2536, an energy restriction counter 2537 (an accumulated energy amount calculation part), and a power restriction determination part 2538 (an instruction issuance limitation part).

Consumed energy information received from the consumed energy estimation part 252 is used by the energy summation counter 2531 and the energy restriction counter 2537. Moreover, power restriction information acquired from the power restriction program 251 is used by the minimum value selection logic 2535.

Every time receiving consumed energy information, the energy summation counter 2531 adds the value of consumed energy shown by the consumed energy information. In other words, the energy summation counter 2531 calculates the summation value of consumed energy.

Further, the energy summation counter 2531 copies the calculated summation value of consumed energy to the power consumption history register 2532 every given time on the basis of an instruction from the energy summation time saturating counter 2533. Then, the energy summation counter 2531 clears the summation value of consumed energy. Thus, the energy summation counter 2531 is configured to calculate the summation value of consumed energy every given time and copy the summation value to the power consumption history register 2532.

The power consumption history register 2532 stores the summation value of consumed energy copied from the energy summation counter 2521 as summation consumed energy information a predetermined number of times. For example, the power consumption history register 2532 stores summation consumed energy information of three times copied from the energy summation counter 2531. The power consumption history register 2532 can be configured to store accumulated consumed energy information of any number of times equal to or more than one.

The energy summation time saturating counter 2533 executes control of a clear direction and a write direction on the energy summation counter 2531 and the power consumption history register 2532, respectively. The energy summation time saturating counter 2533 is configured to provide the above directions to the energy summation counter 2531 and the power consumption history register 2532, respectively every given time. For example, the energy summation time saturating counter 2533 is initialized at a preset specific value (C0) and subtracted by 1 every cycle. Then, when the value of the counter becomes 0, the energy summation time saturating counter 2533 outputs a clear direction and a write direction, and is set to the initial value C0 again.

With the combination of the three components described above (the energy summation counter 2531, the power consumption history register 2532, and the energy summation time saturating counter 2533), the summation value of consumed energy generated during a given time is found. Power is represented by temporal differentiation of consumed energy. Therefore, a value written in the power consumption history register 2532 shows consumed electric energy of the past.

The inrush current restriction calculation part 2534 calculates allowable electric energy with time evolution on the basis of summation consumed energy information stored by the power consumption history register 2532. The allowable electric energy is electric energy which is allowed to flow into the processor core 2, namely, electric energy which the processor core 2 is allowed to consume.

To be specific, for example, the inrush current restriction calculation part 2534 calculates a value obtained by adding predetermined electric energy to the average value of summation consumed energy information of the past three times stored by the power consumption history register 2532, thereby calculating allowable electric energy of a given time. Then, the inrush current restriction calculation part 2534 transmits the calculated allowable electric energy to the minimum value selection logic 2535.

As a result that the inrush current restriction calculation part 2534 calculates allowable electric energy in the above-mentioned manner, the following control becomes possible. For example, in a case where the most recent power consumption is 1 W or so, even if power of 10 W is allocated to the processor core 2 and the processor core 2 can utilize the power of 10 W, it is possible to control so that the processor core 2 utilizes up to 2 W at the maximum next time.

The inrush current restriction calculation part 2534 can be configured to calculate a predetermined minimum value when the power consumption history register 2532 does not store summation consumed energy information. Further, the inrush current restriction calculation part 2534 may be configured to calculate allowable electric energy by a method other than the method illustrated above. For example, the inrush current restriction calculation part 2534 may be configured to calculate a value two times the average value of summation consumed energy information, as allowable electric energy.

The minimum value selection logic 2535 selects, as supplied energy, the smaller electric energy between allowable electric energy received from the inrush current restriction calculation part 2534 and maximum supplied electric energy shown by power restriction information transmitted from the distributed power determination part 262. Then, the minimum value selection logic 2535 transmits the selected electric energy (supplied energy) to the energy restriction counter 2537 at given time intervals on the basis of an instruction of the power restriction time saturating counter 2536.

The power restriction time saturating counter 2536 transmits an add instruction, which is an instruction to transmit the selected electric energy to the energy restriction counter 2537, to the minimum value selection logic 2535. The power restriction time saturating counter 2536 is configured to provide the above instruction every given time. The specific configuration of the power restriction time saturating counter 2536 is, for example, the same as the energy summation time saturating counter 2533 already described.

The energy restriction counter 2537 shows the amount of electric charge accumulated in the capacitor. For example, assuming the processor core 2 can operate until energy accumulated in the capacitor is exhausted, the energy restriction counter 2537 shows the amount of the remaining energy (the amount of accumulated energy) which the processor core 2 can consume.

Upon receiving consumption energy information accompanying issuance of an instruction, the energy restriction counter 2537 subtracts a value based on the consumption energy information from the counter. In other words, the energy restriction counter 2537 is configured to subtract consumed energy accompanying issuance of an instruction from the counter.

Further, the energy restriction counter 2537 receives the value of electric energy (supplied energy) from the minimum value selection logic 2535 every given time, and adds the value to the counter. In other words, the energy restriction counter 2537 is configured to add the value of consumed energy allowed for the core (i.e., the value of supplied energy supplied to the core) every given time. For example, the processor core 2 capable of consuming power of 1 W can consume energy of 1 nJ per 1 ns. Therefore, the energy restriction counter 2537 adds a counter value representing 1 nJ per 1 ns on the basis of supplied energy selected by the minimum value selection logic 2535.

Thus, the energy restriction counter 2537 is configured to summate a subtraction term showing consumed energy and an addition term showing supplied energy which is electric energy selected by the minimum value selection logic 2535. The subtraction term corresponds to electric charge or energy consumed from the capacitor. On the other hand, the addition term corresponds to electric charge or energy flowing into the capacitor. According to the law of conservation of energy, it is through that once electric charge is accumulated, electric charge stays there unless power is consumed. Therefore, the energy restriction counter 2537 shows energy accumulated in the capacitor.

On the basis of the above idea, using any method of estimating the amount of inflowing electric charge and the amount of outflowing electric charge for the present invention is conceived. To be specific, for example, writing and calculating an equation considering influence of capacitor, coil and resistor of a power supply system with respect to a conceiving inflowing current.

Further, the energy restriction counter 2537 takes a counter value with the upper limit. In other words, in the case of a value exceeding a maximum value previously set in the addition process, the maximum value is stored into the energy restriction counter 2537. Moreover, the upper limit value of the energy restriction counter 2537 corresponds to electric charge which can be accumulated in the peripheral capacitor. Therefore, energy consumption in burst is allowed up to a count value of the energy restriction counter 2537.

Further, it is not supposed to occur in principle that the value of the energy restriction counter 2537 overflows in the negative direction. Therefore, when the abovementioned case occurs, it is determined that a failure is occurring.

The power restriction determination part 2538 monitors the counter value of the energy restriction counter 2537. Then, the power restriction determination part 2538 outputs an instruction issuance restriction direction on the basis of the counter value of the energy restriction counter 2537. For example, when the counter value of the energy restriction counter 2537 becomes a negative numerical value, the power restriction determination part 2538 determines power exceeds a predetermined value and outputs an instruction issuance restriction direction. Consequently, issuance of a new instruction is restricted as stated above.

Meanwhile, the power restriction determination part 2538 may be configured to, for example, previously store one restriction threshold or a plurality of restriction thresholds and output an instruction issuance restriction direction on the basis of the result of comparison between the restriction thresholds and the counter value of the energy restriction counter 2537. For example, the power restriction determination part 2538 decreases the rate of instruction issuance in a case where the counter value of the energy restriction counter 2537 becomes lower than a certain restriction threshold 1 (e.g., changes an instruction issuance interval to 10 cycles when the counter value becomes equal to or less than 10). Moreover, the power restriction determination part 2538 stops issuance of an instruction in a case where the counter value of the energy restriction counter 2537 becomes lower than a certain restriction threshold 2, which is a smaller threshold than the restriction threshold 1 (e.g., forbids issuance of an instruction when the counter value becomes negative). The power restriction determination part 2538 may be configured in the abovementioned manner, for example.

Further, as stated above, the energy restriction counter 2537 is configured to receive the value of electric energy (supplied energy) from the minimum value selection logic 2535 every given time and add the value to the counter. Therefore, when a given time passes after the power restriction determination part 2538 outputs an instruction issuance restriction direction, the counter value of the energy restriction counter 2537 increases, and there is no factor for the power restriction determination part 2538 to output an instruction issuance restriction direction. As a result, issuance of an instruction is restarted.

That is an example of the configuration of the multi-core processor 1.

In this exemplary embodiment, the energy summation counter 2531 summates consumed energy on the basis of consumed energy information. However, another method may be employed as far as consumed energy can be estimated by the method.

For example, the energy summation counter 2531 may be configured to add the total of supplied electric energy added to the energy restriction counter 2537 as consumed energy. To be specific, for example, the energy summation counter 2531 can be configured to, when adding electric energy selected by the minimum selection logic 2535 to the energy restriction counter 2537, summate an energy value calculated by the following equation:

$$\text{value added to energy summation counter} = \text{MIN}(\text{Max}Ee, Ee+Ep) - Ee, \text{ where:}$$

$Ee$=the counter value of the energy restriction counter 2537,
$Ep$=electric energy selected by the minimum value selection logic 2535, and
Max$Ee$=the upper limit value of the energy restriction counter 2537.

Next, the operation of the processor core 2 will be described. As shown in FIG. 7, the processor core 2 in this exemplary embodiment operates in almost the same manner as a general processor.

That is to say, referring to FIG. 7, the instruction fetching and decoding part 21 acquires instruction information from the main storage device and decodes the instruction information. Then, the instruction fetching and decoding part 21 transmits the decoded instruction information to the instruction scheduling part 22 (step S101).

Subsequently, the instruction scheduling part 22 checks a dependency relation with preceding and succeeding instructions, and transmits the instruction information to the instruction execution part 23 (step S102). After that, the instruction execution part 23 executes an instruction on the basis of the received instruction information (step S103).

The processor core 2 performs almost the same operation as a general processor as described above, for example. However, the processor core 2 in this exemplary embodiment operates in a different way from a general processor in the following point.

Referring to FIG. 8, the instruction scheduling part 22 transmits issued instruction information to the instruction issuance restriction part 25 when transmitting instruction information to the instruction execution part 23 (step S201).

Subsequently, the instruction issuance restriction part 25 receives the issued instruction information. Then, the consumed energy estimation part 252 of the instruction issuance restriction part 25 calculates consumed energy on the basis of the issued instruction information and power statistics information acquired from the distributed power determination part 262 (step S202). Then, the consumed energy estimation part 252 transmits consumed energy information showing the consumed energy to the instruction issuance rate determination part 253. Moreover, the consumed energy estimation part 252 notifies consumed electric energy notification, which is information equivalent to consumed energy information, to the LSI power management part 26. After that, the LSI power management part 26 transmits power restriction information to the respective processor cores 2 in accordance with the consumed electric energy notification accepted from the respective processor cores 2.

After that, the instruction issuance rate determination part 253 receives the consumed energy information. Moreover, the instruction issuance rate determination part 253 receives the power restriction information from the LSI power management part 26. Then, the instruction issuance rate determination part 253 calculates the amount of accumulated energy on the basis of the received consumed energy information and power restriction information (step S203). Then, the instruction issuance rate determination part 253 outputs an instruction issuance restriction direction on the basis of the calculated amount of accumulated energy (step S204).

The instruction issuance restriction direction output by the instruction issuance rate determination part 253 is transmitted to the instruction scheduling part 22. Then, upon receiving the instruction issuance restriction direction, the instruction scheduling part 22 restricts issuance of a new instruction on the basis of the received instruction issuance restriction direction (step S205).

Thus, the processor core 2 in this exemplary embodiment calculates consumed energy on the basis of issued instruction information, and calculates the amount of accumulated energy on the basis of the calculated consumed energy. Then, the processor core 2 restricts issuance of a new instruction on the basis of the amount of accumulated energy.

Subsequently, the operation of the instruction issuance rate determination part 253 in calculating the amount of accumulated energy will be described.

Referring to FIG. 9, in the energy restriction counter 2537 of the instruction issuance rate determination part 253, every time a given time passes (step S301: Yes), electric energy selected by the minimum value selection logic 2535 is added (step S302). On the other hand, in the energy restriction counter 2537, every time consumed energy information is received (step S303: Yes), consumed energy shown by the consumed energy information is subtracted (step S304).

Thus, the amount of accumulated energy is calculated on the basis of electric energy added every given time (supplied energy) and consumed energy subtracted every time consumed energy information is received (every time an instruction is issued).

Subsequently, the operation performed from reception of consumed energy information by the instruction issuance rate determination part 253 to selection of electric energy by the minimum value selection logic 2535 will be described.

Referring to FIG. 10, when the instruction issuance rate determination part 253 acquires consumed energy information, the energy summation counter 2531 calculates a summation value of consumed energy of a given time (step S401). Then, the energy summation counter 2531 stores the summation value of the summated consumed energy into the power consumption history register 2532 as summation consumed energy information.

Subsequently, the inrush current restriction calculation part 2534 calculates allowable electric energy by adding predetermined electric energy to the average value of the summation consumed energy information stored in the power consumption history register 2532 (step S402). Then, the inrush current restriction calculation part 2534 transmits the calculated allowable electric energy to the minimum value selection logic 2535.

The minimum value selection logic 2535 compares the allowable electric energy received from the inrush current restriction calculation part 2534 with the power restriction information received from the distributed power determination part 262 (step S403).

In a case where the allowable electric energy is larger than the power restriction information (maximum supplied electric energy represented thereby) (step S403: Yes), the minimum value selection logic 2535 selects the maximum supplied electric energy represented by the power restriction information as supplied energy (step S404). On the other hand, in a case where the allowable electric energy is equal to or less than the power restriction information (the maximum supplied electric energy represented thereby) (step S403: No), the minimum value selection logic 2535 selects the allowable electric energy as supplied energy (step S405).

Through the operation as described above, the minimum value selection logic 2535 selects supplied energy. Then, the supplied energy selected by the minimum value selection logic 2535 is added to the energy restriction counter 2537 every given time (step S406).

Subsequently, the operation of the LSI power management part 26 when calculating maximum supplied electric energy will be described.

Referring to FIG. 11, the used power ratio calculation part 261 of the LSI power management part 26 receives consumed electric energy information from each of the processor cores 2 (step S501). Then, the used power ratio calculation part 261 calculates the ratio of electric energy consumed by the respective processor cores 2 on the basis of the consumed electric energy notification notified from the respective processor cores 2 (step S502). After that, the used power ratio calculation part 261 transmits a power ratio representing the calculated ratio of electric energy to the distributed power determination part 262.

The distributed power determination part 262 receives the power ratio from the used power ratio calculation part 261. Moreover, the distributed power determination part 262 acquires power control information to be described later from the control information setting register 263. Then, the distributed power determination part 262 determines maximum supplied electric energy for each of the processor cores 2 on the basis of the power ratio received from the used power ratio calculation part 261 and the power control information acquired from the control information setting register 263 (step S503). After that, the distributed power determination part 262 transmits the determined maximum supplied electric energy as power restriction information to the instruction issuance rate determination part 253 of each of the processor cores 2 (step S504).

That is the description of the operation of the processor core 2.

Now, the mechanism of malfunction of the electronic circuit (the processor core 2) considering a capacitor and control executed when the capacitor is considered will be described.

FIG. 12 shows electric charge accumulated in a capacitor in a case where a circuit having the capacitor increases power consumption from 10 W to 50 W, which exceeds a rating (20 W), at time 3 and keeps an operation rate of consuming 50 W.

In the case shown in FIG. 12, it is possible to use the electric charge accumulated in the capacitor at times 3, 4, 5 and 6. Therefore, the electronic circuit can normally operate by using the electric charge accumulated in the capacitor. On the other hand, at time 7, the electric charge accumulated in the capacitor is 0. Therefore, in this case, the electronic circuit is supposed to cause malfunction at time 7.

Judging from the above, the circuit can be kept from malfunctioning in a case where power consumption exceeds the rating but returns to the rating of 20 W before the electric charge in the capacitor is exhausted as shown in FIG. 13, for example. In other words, execution of control considering the capacitor as described above allows control so that power more than the rating can be temporarily used without malfunction.

The abovementioned control is thought to be greatly effective in a case where operation is periodic and power consumption increases and decreases alternately depending on time.

For example, let us suppose a process which needs power consumption of 50 W only at times 3 and 4 as shown in FIG. 14. Moreover, let us suppose a case where, after the abovementioned process, a low operation rate period in which operation is possible with 10 W is kept and a process which needs 50 W is executed again.

In this case, the capacitor is taken into consideration, so that sufficient electric charge is left in the capacitor at time 4 and hence there is no need to execute power control. Moreover, the electric charge consumed at times 3 and 4 recovers during a period that power consumption is 10 W. Therefore, the circuit operates without any problem even when again executing a process which needs 50 W. Therefore, in the above case, there is no need to execute control for limiting power consumption.

On the other hand, in a case where the capacitor is not taken into consideration, power consumption is controlled to keep the rating of 20 W as shown in FIG. 15, for example. In this case, power consumption for the process executed at times 3 and 4 shown in FIG. 14 is restricted to 20 W. Therefore, the process does not complete until time 8, and a situation that a succeeding process also delays is supposed to occur.

By thus controlling power consumption while considering a capacitor, it is possible to precisely control power consumption of an electronic circuit without executing unnecessary control.

Thus, the processor core 2 in this exemplary embodiment has the consumed energy estimation part 252 and the instruction issuance rate determination part 253. The instruction scheduling part 22 is configured to transmit issued instruction information to the instruction issuance restriction part 25, and the statistics information setting register 251 is configured to store power statistics information and the distributed power determination part 262 is configured to calculate power restriction information. Such a configuration allows the instruction issuance restriction part 25 to calculate consumed energy appropriate for an instruction on the basis of the issued instruction information and the power statistics information. Moreover, the instruction issuance rate determination part 253 can calculate the amount of accumulated energy on the basis of the consumed energy and the power restriction information. As a result, the instruction issuance rate determination part 253 can transmit an instruction issuance restriction direction on the basis of the amount of accumulated energy. Consequently, the processor core 2 can restrict power consumption in consideration of electric charge accumulated in the capacitors inside and outside the chip and, for example, in a case where a processing time is sufficiently short (a process ends before power accumulated in the capacitors is exhausted), the processor core 2 can execute control such as consuming power exceeding a rating and completing calculation at high speeds. In other words, the processor core 2 can precisely control power consumption of an electronic circuit without executing unnecessary control.

Further, the processor core 2 in this exemplary embodiment has the inrush current restriction calculation part 2534 and the minimum value selection logic 2535. Such a configuration allows the inrush current restriction calculation part 2534 to calculate allowable electric energy on the basis of the consumed energy. Moreover, the minimum value selection logic 2535 can select, as supplied energy, electric energy which is the smaller in value of the allowable electric energy calculated by the inrush current restriction calculation part 2534 and the electric energy shown by the power restriction information. As a result, for example, in a case where the most recent power consumption is about 1 W, the processor core 2 can execute control so as to use only 2 W at the maximum next time even if usable power allocated to the processor core 2 is 10 W. When power consumption of the circuit drastically changes, the amount of current flowing in the circuit drastically changes. Consequently, voltage drops largely, and there is a probability that malfunction is caused. Therefore, as a result that the minimum value selection logic 2535 selects electric energy which is the smaller in value of the allowable electric energy and the electric energy shown by the power restriction information as stated above, it is possible to decrease the probability of malfunction due to voltage drop.

Further, in order to decrease the probability of malfunction mentioned above, it can be thought to, for example, increase the number of capacitors, or restrict the number of implementable transistors. On the other hand, because the present invention includes the inrush current restriction calculation part 2534 and the minimum value selection logic 2535 as stated above, it is possible to reduce the probability of malfunction without adjustment of the capacitors or transistors as described above. In other words, because the processor core 2 in this exemplary embodiment has the inrush current restriction calculation part 2534 and the minimum value selection logic 2535, it is possible to decrease the probability of malfunction without excessively increasing the number of the capacitors or limiting the number of the transistors.

Further, the multi-core processor 1 in this exemplary embodiment includes a plurality of processor cores 2. Each of the processor cores 2 is configured to calculate consumed energy on the basis of issued instruction information corresponding to an instruction issued by the processor core 2 and power statistics information. Such a configuration allows each of the processor cores 2 included by the multi-core processor 1 to manage the consumed energy of the processor core 2 on the basis of an instruction issued by the processor core 2. As a result, it is possible to restrict power consumption for each of the processor cores 2.

Further, power statistics information used by the processor core 2 shows at least change of power consumption of the core in execution of arithmetic processing and the shared portion used in execution of arithmetic processing. As stated above, the processor core 2 is configured to calculate consumed energy by using an instruction issued by the processor core 2 and power statistics information. Such a configuration allows the processor core 2 to calculate consumed energy on the basis of issued instruction information without being provided with a network for collection of power consumption information of components including the shared portion such as the shared cache 3 and the external memory 31 used in execution of arithmetic processing. Therefore, the abovementioned configuration allows reduction of the cost of providing the network for collection of power consumption information. Moreover, as stated above, the power statistics information also shows change of power of the shared portion. Therefore, each of the processor cores 2 can control power consumption in consideration of power consumption of the shared portion and so on used when the processor core 2 executes arithmetic processing. As a result, it is possible to execute more precise control of power consumption.

Further, the multi-core processor 1 in this exemplary embodiment has the LSI power management part 26. This configuration enables the LSI power management part 26 to determine maximum supplied electric energy for each of the processor cores 2 on the basis of consumed energy calculated by the processor core 2. Maximum supplied electric energy is the upper limit value of electric energy which can be supplied to the processor core 2. As a result, the multi-core processor 1 can distribute electric energy supplied to the LSI to the respective processor cores 2 on the basis of the consumed energy calculated by the respective processor cores 2. Consequently, it is possible to prevent limitation of instruction issuance due to power restriction from occurring though the LSI can still use electric power and, as a result, it is possible to control power consumption for each processor core without diminishing the performance of the whole.

In this exemplary embodiment, the consumed energy estimation part 252 calculates consumed energy by using the kind of an instruction, the number of registers to be written and read, a vector length, and so on. However, the consumed energy estimation part 252 can be configured to calculate consumed energy by using a value other than the above values. For example, the consumed energy estimation part 252 can be configured to calculate consumed energy by using the presence/absence of predication (mask), the presence/absence of cache hit, a performance counter value, and so on.

For example, some processors each have a performance counter for measuring the rate of cache hit. In this case, it is thought that the consumed energy estimation part 252 changes an estimation value of consumed energy of a load/store instruction referring to the value of the performance counter.

Further, the consumed energy estimation part 252 may be configured not to receive power statistics information from the power control program 251. In this case, the consumed energy estimation part 252 calculates consumed energy on the basis of a predetermined value and issued instruction information, for example.

Further, a configuration that the value of accumulation consumed energy information stored in the power consumption history register 2532 can be referred to from outside is possible. Such a configuration makes it possible to, for example, estimate the amount of generated heat from the value of accumulation consumed energy information and regulate air conditioning of a machine room on the basis of the estimated heat generation amount.

Further, in this exemplary embodiment, malfunction is caused when electric charge accumulated in a capacitor becomes 0. However, as a physical phenomenon, malfunction may be caused when voltage supplied to a circuit decreases about 10%. Therefore, the power restriction determination part 2538 may be configured to output an instruction issuance restriction direction at a stage that the counter value of the energy restriction counter 2537 changes about 10%. Thus, the timing for output of an instruction issuance restriction direction by the power restriction determination part 2538 is not limited to a case where the counter value of the energy restriction counter 2537 becomes negative or less than 10.

Further, the distributed power management part 262 may be configured to determine maximum supplied electric energy in consideration of power accumulated in the capacitor, for example.

Further, in this exemplary embodiment, a case where the multi-core processor 1 has the LSI power management part 26 is described. However, the function of the LSI power management part 26 may be realized as a function included by an information processing device outside the multi-core processor 1. That is to say, the present invention may be realized by configuration including a multi-core processor and an external device which has a function as the LSI power management part 26.

[Second Exemplary Embodiment]

Figure 16:
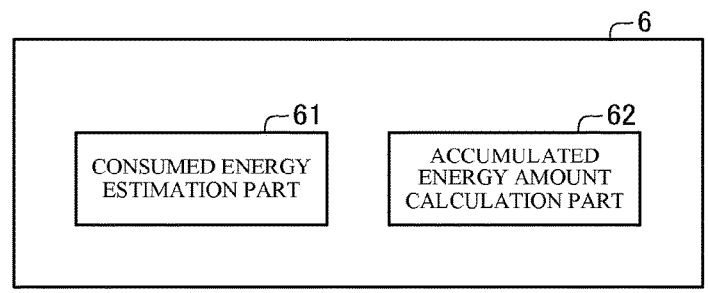
FIG. 16 is a schematic block diagram showing the overview of the configuration of an electronic circuit according to a second exemplary embodiment of the present invention.

A second exemplary embodiment of the present invention will be described referring to FIG. 16. FIG. 16 is a schematic block diagram showing an example of the configuration of an electronic circuit 6.

Referring to FIG. 16, the electronic circuit 6 has a consumed energy estimation part 61 and an accumulated energy amount calculation part 62.

The consumed energy estimation part 61 calculates consumed energy, which is energy consumed in execution of arithmetic processing for an issued instruction on the basis of the instruction. In other words, when the electronic circuit 6 executes arithmetic processing, the consumed energy estimation part 61 calculates energy consumed in the arithmetic processing. Then, the consumed energy estimation part 61 transmits the calculated consumed energy to the accumulated energy amount calculation part 62.

On the basis of the consumed energy calculated by the consumed energy estimation part 61 and supplied energy which is supplied to the circuit, the accumulated energy amount calculation part 62 calculates an accumulated energy amount, which is the amount of energy accumulated in the capacitor in which electric charges consumed by the electronic circuit are accumulated. In other words, on the basis of the consumed energy and the supplied energy, the accumulated energy calculation part 62 calculates the amount of accumulated energy which is accumulated in the capacitor and is available to the electronic circuit.

As stated above, the electronic circuit 6 in this exemplary embodiment has the consumed energy estimation part 61 and the accumulated energy amount calculation part 62. Such a configuration enables the consumed energy estimation part 61 to calculate energy consumed in arithmetic processing, namely, consumed energy. Moreover, the accumulated energy amount calculation part 62 can calculate an accumulated energy amount on the basis of the consumed energy calculated by the consumed energy estimation part 61 and the supplied energy. As a result, the electronic circuit 6 can control power consumption in consideration of the amount of accumulated energy accumulated in the capacitor. Consequently, the electronic circuit 6 can precisely control power consumption without executing unnecessary control.

[Third Exemplary Embodiment]

Figure 17:
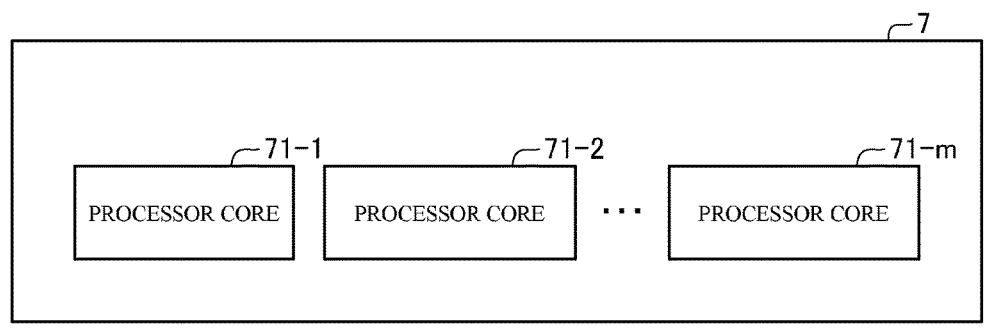
FIG. 17 is a schematic block diagram showing the overview of the configuration of a multi-core processor according to a third exemplary embodiment of the present invention.

A third exemplary embodiment of the present invention will be described referring to FIG. 17. FIG. 17 is a schematic block diagram showing an example of the configuration of a multi-core processor 7.

Referring to FIG. 17, the multi-core processor 7 has a plurality of processor cores 71-1, 71-2, . . . , 71-*m* (hereinafter, referred to as processor cores 71 when not distinguished particularly).

The processor core 71 calculates consumed energy which is energy consumed when an instruction issued thereby is executed, on the basis of issued instruction information showing an instruction issued by the processor core 71 and power consumption information showing change of power consumption caused in executing processing appropriate for the instruction. In other words, each of the processor cores 71 included by the multi-core processor 7 is configured to calculate consumed energy which is energy consumed when an instruction processed thereby is executed.

Thus, the multi-core processor 7 in this exemplary embodiment is configured so that the processor cores 71 each calculate consumed energy on the basis of issued instruction information and power statistics information. Such a configuration enables each of the processors 7 to limit issuance of a new instruction on the basis of the calculated consumed energy. That is to say, the abovementioned configuration enables each of the processor cores 7 to control the upper limit of power consumption. As a result, it is possible to more precisely control power consumption.

Further, because the processor cores 7 each calculate consumed energy on the basis of issued instruction information and power statistics information, it becomes possible to calculate consumed energy without providing a network for collecting power consumption information of each component. As a result, it becomes possible to reduce the cost of providing the power consumption network.

[Fourth Exemplary Embodiment]

Figure 18:
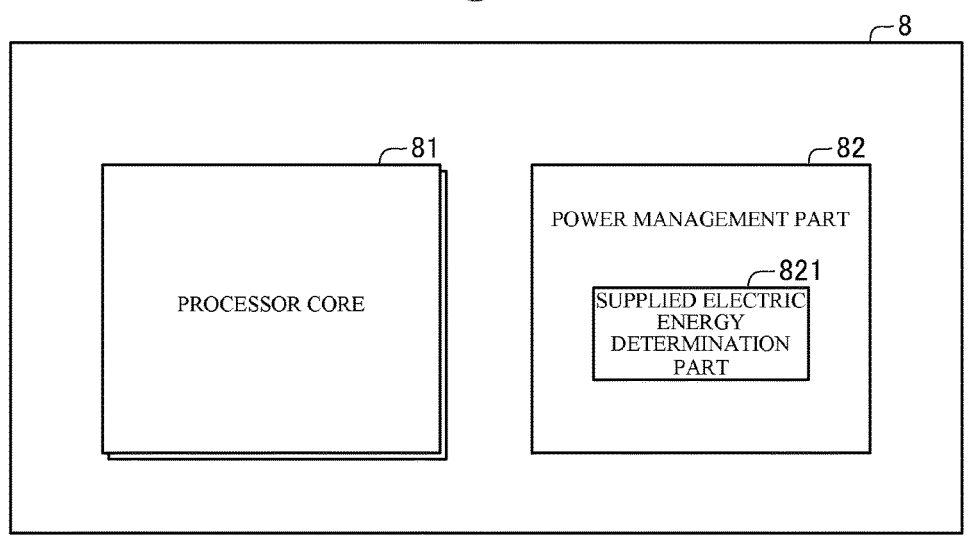
FIG. 18 is a schematic block diagram showing the overview of the configuration of a multi-core processor according to a fourth exemplary embodiment of the present invention.

A fourth exemplary embodiment of the present invention will be described referring to FIG. 18. FIG. 18 is a schematic block diagram showing an example of the configuration of a multi-core processor 8.

Referring to FIG. 18, the multi-core processor 8 has a plurality of processor cores 81 and a power management part 82. The power management part 82 has a supplied electric energy determination part 821.

The power management part 82 manages power supplied to each of the plurality of processor cores 81. The power management part 82 has the supplied electric energy determination part 821 as stated above.

The supplied electric energy determination part 821 determines maximum supplied electric energy for each of the plurality of processor cores 81. Maximum supplied electric energy is the upper limit value of supplied electric energy which can be supplied to each of the plurality of processor cores 81.

As stated above, the multi-core processor 8 in this exemplary embodiment has the power management part 82 having the supplied electric energy determination part 821. Such a configuration enables the supplied electric energy determination part 821 to determine, for each of the processor cores 81, maximum supplied electric energy that is the upper limit value of supplied electric energy which can be supplied to each of the processor cores 81. As a result, the multi-core processor 8 can allocate supplied electric energy supplied to the whole multi-core processor 8 in accordance with the operation conditions of the respective processor core 81, and the LSI can effectively use up power. Consequently, it is possible to control power consumption for each processor core without diminishing the performance of the whole.

Further, the multi-core processor 8 can be realized by installation of a predetermined program in the multi-core processor 8. To be specific, a program as another aspect of the present invention is a program for causing an information processing device to realize a power management unit managing power supplied to a plurality of processor cores. The power management unit determines, for each of the processor cores, maximum supplied electric energy that is the upper limit value of supplied electric energy which can be supplied to each of the processor cores.

Further, a power control method executed by operation of the multi-core processor 8 stated above is a method of determining, for each of a plurality of processor cores, maximum supplied electric energy that is the upper limit value of supplied electric energy which can be supplied to each of the processor cores. To each of the processor cores, power is supplied on the basis of the determined maximum supplied electric energy.

The program and the power control method having the abovementioned configurations have the same actions as the multi-core processor 8, and hence, can achieve the abovementioned object of the present invention.

<Supplementary Notes>

The whole or part of the exemplary embodiments disclosed above can be described as the following supplementary notes. Below, the overview of a multi-core processor and so on of the present invention will be described. However, the present invention will not be limited to the following configurations.

(Supplementary Note 1)

A multi-core processor comprising:

a plurality of processor cores; and a power management part managing power supplied to the plurality of processor cores, wherein the power management part has a supplied electric energy determination part determining maximum supplied electric energy for each of the plurality of processor cores, the maximum supplied electric energy being an upper limit value of supplied electric energy which can be supplied to the processor core.

(Supplementary Note 2)

The multi-core processor according to Supplementary Note 1, wherein:

each of the plurality of processor cores has a consumed energy calculation part calculating consumed energy, the consumed energy being energy consumed in execution of arithmetic processing corresponding to an instruction issued by the processor core on a basis of the instruction; and the supplied electric energy determination part determines maximum supplied electric energy for each of the plurality of processor cores on a basis of the consumed energy calculated by the processor core, the maximum supplied electric energy being an upper limit value of supplied electric energy which can be supplied to the processor core.

(Supplementary Note 3)

The multi-core processor according to Supplementary Note 2, wherein:

the power management part has a used electric energy ratio calculation part calculating a ratio of electric energy consumed by each of the plurality of processor cores on a basis of the consumed energy calculated by the processor core; and the supplied electric energy determination part determines the maximum supplied electric energy for each of the plurality of processor cores on a basis of the ratio of electric energy calculated by the used electric energy ratio calculation part.

(Supplementary Note 4)

The multi-core processor according to Supplementary Note 3, wherein the supplied electric energy determination part distributes electric energy which can be supplied to the multi-core processor to the plurality of processor cores on a basis of the ratio of electric energy calculated by the used electric energy ratio calculation part, and thereby determines the maximum supplied electric energy for each of the plurality of processor cores.

(Supplementary Note 5)

The multi-core processor according to Supplementary Note 3, wherein the supplied electric energy determination part distributes remainder left after subtracting a total value of electric energy equally allocated to the plurality of processor cores from electric energy which can be supplied to the multi-core processor, to the plurality of processor cores on a basis of the ratio of electric energy, and thereby determines the maximum supplied electric energy for each of the plurality of processor cores.

(Supplementary Note 6)

The multi-core processor according to Supplementary Note 1, wherein:

a power allocation priority is previously determined for each of the plurality of processor cores; and the supplied electric energy determination part determines the maximum supplied electric energy in accordance with the power allocation priority determined for the processor core.

(Supplementary Note 7)

The multi-core processor according to Supplementary Note 1, wherein each of the plurality of processor cores has an instruction issuance control part controlling issuance of a new instruction in accordance with the maximum supplied electric energy determined by the supplied electric energy determination part.

(Supplementary Note 8)

The multi-core processor according to Supplementary Note 7, wherein:

each of the plurality of processor cores is configured to calculate an amount of accumulated energy accumulated in a capacitor in which electric charge consumable in instruction processing is accumulated, by subtracting the consumed energy calculated by the processor core from supplied energy calculated on a basis of the maximum supplied electric energy determined by the supplied electric energy determination part; and the instruction issuance control part included by each of the plurality of processor cores controls issuance of a new instruction on a basis of the calculated amount of accumulated energy.

(Supplementary Note 9)

A power control method comprising:

determining maximum supplied electric energy for each of a plurality of processor cores, the maximum supplied electric energy being an upper limit value of supplied electric energy which can be supplied to the processor core, wherein power is supplied to each of the plurality of processor cores on a basis of the determined maximum supplied electric energy.

(Supplementary Note 9-1)

The power control method according to Supplementary Note 9, comprising:

by each of the plurality of processor cores, calculating consumed energy that is energy consumed in execution of arithmetic processing corresponding to an instruction issued by the processor core on a basis of the instruction; and determining maximum supplied electric energy for each of the plurality of processor cores on a basis of the consumed energy calculated by the processor core, the maximum supplied electric energy being an upper limit value of supplied electric energy which can be supplied to the processor core.

(Supplementary Note 9-2)

The power control method according to Supplementary Note 9, comprising:

calculating a ratio of electric energy consumed by each of the plurality of processor cores on a basis of the consumed energy calculated by the processor core; and determining the maximum supplied electric energy for each of the plurality of processor cores on a basis of the calculated ratio of electric energy.

(Supplementary Note 9-3)

The power control method according to Supplementary Note 9-2, comprising:

distributing electric energy which can be supplied to the multi-core processor to the plurality of processor cores on a basis of the calculated ratio of electric energy, and thereby determines the maximum supplied electric energy for each of the plurality of processor cores.

(Supplementary Note 10)

A non-transitory computer-readable medium storing a program comprising instructions for causing an information processing device to realize a power management unit managing power supplied to a plurality of processor cores, wherein the power management unit determines maximum supplied electric energy for each of the plurality of processor cores, the maximum supplied electric energy being an upper limit value of supplied electric energy which can be supplied to the processor core.

(Supplementary Note 10-1)

The non-transitory computer-readable medium storing the program according to Supplementary Note 10, wherein:

each of the plurality of processor cores is caused to realize a consumed energy calculation part calculating consumed energy, the consumed energy being energy consumed in execution of arithmetic processing corresponding to an instruction issued by the processor core on a basis of the instruction; and the power management unit determines maximum supplied electric energy for each of the plurality of processor cores on a basis of the consumed energy calculated by the processor core, the maximum supplied electric energy being an upper limit value of supplied electric energy which can be supplied to the processor core.

(Supplementary Note 11)

The non-transitory computer-readable medium storing the program according to Supplementary Note 10, wherein the power management unit calculates a ratio of electric energy consumed by each of the plurality of processor cores on a basis of the consumed energy calculated by the processor core, and determines the maximum supplied electric energy for each of the plurality of processor cores on a basis of the calculated ratio of electric energy.

(Supplementary Note 11-1)

The non-transitory computer-readable medium storing the program according to Supplementary Note 11, wherein the power management unit distributes electric energy which can be supplied to the multi-core processor to the plurality of processor cores on a basis of the calculated ratio of electric energy, and thereby determines the maximum supplied electric energy for each of the plurality of processor cores.

The program disclosed in the exemplary embodiments and supplementary notes is stored in a storage device or recorded on a computer-readable recording medium. For example, the recording medium is a portable medium such as a flexible disk, an optical disk, a magneto-optical disk and a semiconductor memory.

Although the present invention has been described referring to the exemplary embodiments, the present invention is not limited to the exemplary embodiments. The configurations and details of the present invention can be changed and modified in various manners that can be understood by one skilled in the art within the scope of the present invention.

The invention claimed is:

1. A multi-core processor, comprising:
a plurality of processor cores; and
a power management part that manages power supplied to the plurality of processor cores,
wherein the power management part has a supplied electric energy determination part that determines a maximum supplied electric energy for each of the plurality of processor cores, the maximum supplied electric energy being an upper limit value of supplied electric energy which can be supplied to the processor core, wherein a power allocation priority is previously determined for each of the plurality of processor cores, and a maximum electric energy is previously determined for the power allocation priority, wherein, in accordance with the power allocation priority determined for each of the processor cores, the supplied electric energy determination part determines the maximum supplied electric energy for each of the processor cores by allocating the maximum electric energy, determined for the power allocation priority, to the processor cores having a same power allocation priority, and wherein each one of the processor cores has a supplied energy selection part that selects, as an electric energy to be supplied actually to the processor core, a smaller electric energy of the maximum supplied electric energy determined by the supplied electric energy determination part and an allowable electric energy calculated by an inrush current restriction calculation part based on consumed energy.

2. The multi-core processor according to claim 1, wherein:

each of the plurality of processor cores has a consumed energy calculation part that calculates consumed energy, the consumed energy being energy consumed in execution of arithmetic processing corresponding to an instruction issued by the processor core on a basis of the instruction; and the supplied electric energy determination part determines maximum supplied electric energy for each of the plurality of processor cores on a basis of the consumed energy calculated by the processor core, the maximum supplied electric energy being an upper limit value of supplied electric energy which can be supplied to the processor core.

3. The multi-core processor according to claim 2, wherein:

the power management part has a used electric energy ratio calculation part that calculates a ratio of electric energy consumed by each of the plurality of processor cores on a basis of the consumed energy calculated by the processor core; and the supplied electric energy determination part determines the maximum supplied electric energy for each of the plurality of processor cores on a basis of the ratio of electric energy calculated by the used electric energy ratio calculation part.

4. The multi-core processor according to claim 3, wherein the supplied electric energy determination part distributes electric energy which can be supplied to the multi-core processor to the plurality of processor cores on a basis of the ratio of electric energy calculated by the used electric energy ratio calculation part, and thereby determines the maximum supplied electric energy for each of the plurality of processor cores.

5. The multi-core processor according to claim 3, wherein the supplied electric energy determination part distributes a remainder left after subtracting a total value of electric energy equally allocated to the plurality of processor cores from electric energy which can be supplied to the multi-core processor, to the plurality of processor cores on a basis of the ratio of electric energy, and thereby determines the maximum supplied electric energy for each of the plurality of processor cores.

6. The multi-core processor according to claim 1, wherein each of the plurality of processor cores has an instruction issuance control part that controls issuance of a new instruction in accordance with the maximum supplied electric energy determined by the supplied electric energy determination part.

7. The multi-core processor according to claim 6, wherein:

each of the plurality of processor cores is configured to calculate an amount of accumulated energy accumulated in a capacitor in which electric charge consumable in instruction processing is accumulated, by subtracting the consumed energy calculated by the processor core from supplied energy calculated on a basis of the maximum supplied electric energy determined by the supplied electric energy determination part; and the instruction issuance control part included by each of the plurality of processor cores controls issuance of a new instruction on a basis of the calculated amount of accumulated energy.

8. A power control method carried out by an electronic device to electronically manage energy supplied to a plurality of processor cores, the method comprising:

determining maximum supplied electric energy for each of the plurality of processor cores, the maximum supplied electric energy being an upper limit value of supplied electric energy which can be supplied to the processor core, wherein power is supplied to each of the plurality of processor cores on a basis of the determined maximum supplied electric energy, wherein a power allocation priority is previously determined for each of the plurality of processor cores, and maximum electric energy is previously determined for the power allocation priority, wherein, in accordance with the power allocation priority determined for each of the processor cores, the maximum supplied electric energy is determined for each of the processor cores by allocating the maximum electric energy, determined for the power allocation priority, to the processor cores having a same power allocation priority; and selecting, for each one of the processor cores, an electric energy to be supplied actually to the processor core as a smaller electric energy of i) the determined maximum supplied electric energy and ii) an allowable electric energy calculated by an inrush current restriction calculation part based on consumed energy.

9. A non-transitory computer-readable medium having stored thereon a program comprising instructions that, upon execution by an information processing device, causes the information processing device to function as a power management unit that manages power supplied to a plurality of processor cores, said power management unit thus configured to:

determine a maximum supplied electric energy for each of the plurality of processor cores, the maximum supplied electric energy being an upper limit value of supplied electric energy which can be supplied to the processor core, wherein a power allocation priority is previously determined for each of the plurality of processor cores, and maximum electric energy is previously determined for the power allocation priority, wherein, in accordance with the power allocation priority determined for each of the processor cores, the maximum supplied electric energy is determined for each of the processor cores by allocating the maximum electric energy, determined for the power allocation priority, to the processor cores having a same power allocation priority, and wherein, for each one of the processor cores, an electric energy to be supplied actually to the processor core is selected as a smaller electric energy of i) the determined maximum supplied electric energy and ii) an allowable electric energy calculated by an inrush current restriction calculation part based on consumed energy.

* * * * *